Patented May 8, 1951

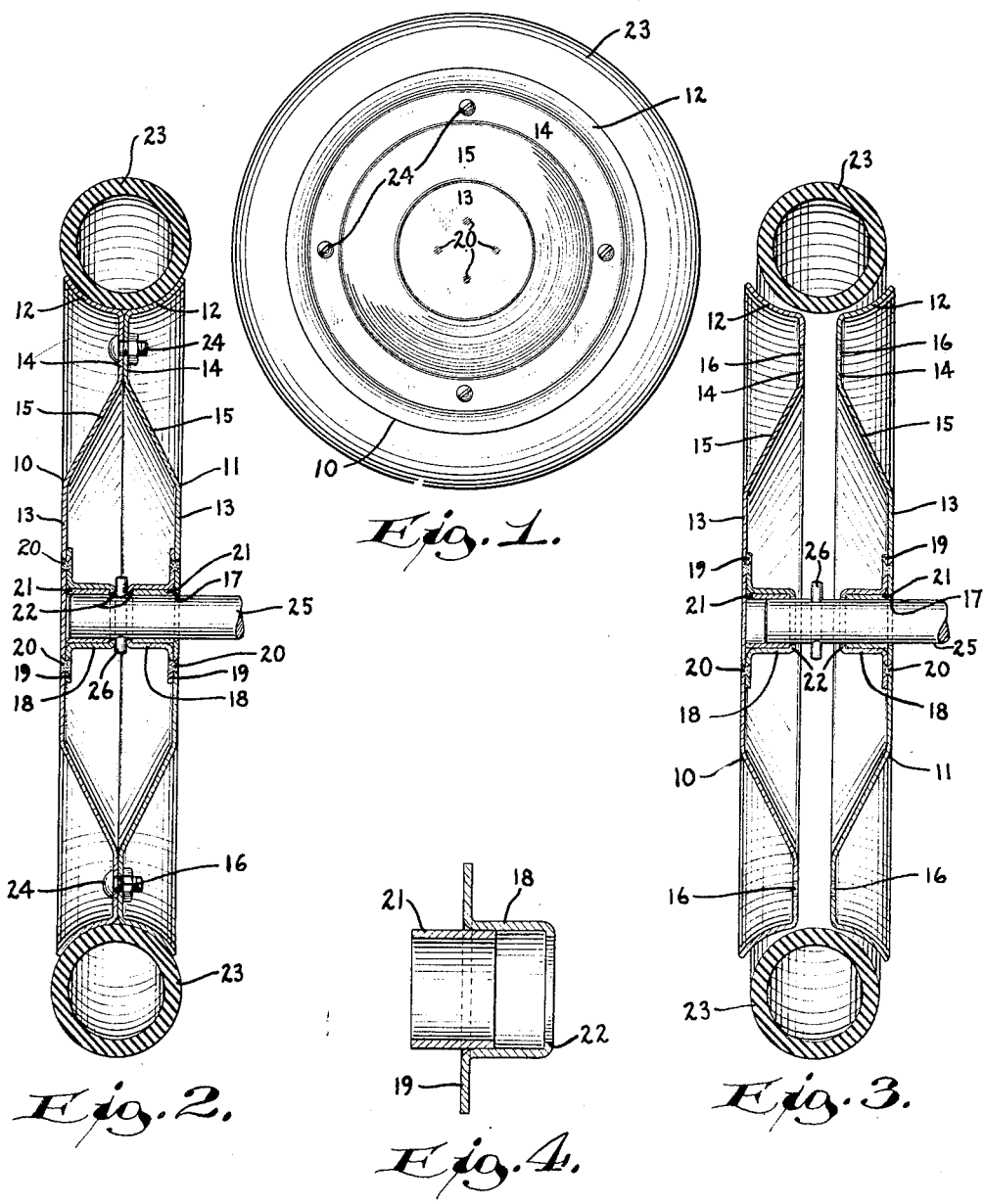

2,551,763

UNITED STATES PATENT OFFICE 2,551,763

WHEEL ASSEMBLY

Milton G. Schley, Waukesha, Wis., assignor to
S-M Engineering Company, Watertown, Wis.,
a corporation of Wisconsin Application May 3, 1946, Serial No. 666,860

4 Claims. (Cl. 301—63)

The present invention relates generally to improvements in the art of constructing wheels or the like, and relates more particularly to an improved sheet-metal wheel and method of assembling the same.

A primary object of my invention is to provide an improved wheel which is of simple and sturdy construction, which may be readily assembled by a novice, and wherein the means for retaining the wheel on the axle of the vehicle is housed entirely within the opposed wheel elements.

Another specific object of the present invention is to provide an improved wheel especially adapted for use on vehicles such as coaster wagons, velocipedes, and perambulators, and which may be readily assembled and dismantled without special equipment for replacement of the usual rubber tire or the like.

Another specific object of the present invention is to provide an improved sheet-metal wheel assemblage wherein there are no hub parts projecting beyond the outer disk element of the wheel.

Another specific object of this invention is to provide an improved wheel assemblage which may be easily dismantled and provided with a peripheral rubber tire of the desired thickness at the will of the user by the simple manipulation of ordinary bolts.

Another specific object of my invention is to provide an improved sheet-metal wheel assemblage wherein the axle terminates within the enclosing disk elements, thus eliminating the usual need for a separate hub cap and permitting provision of an assemblage wherein the tire of rubber or other relatively soft material projects laterally beyond all other parts of the wheel.

Another specific object of the invention is to provide an improved sheet metal wheel assemblage which may be manufactured at low cost with the aid of simple punches and dies.

Another specific object of the present invention is to provide an improved sheet-metal wheel of extremely durable and inexpensive construction, and which is formed of few interchangeably similar parts.

A further specific object of my present invention is to provide an improved wheel and method of assembling the same, wherein the bearing structure is totally enclosed and protected and confined in proper position.

An additional specific object of this invention is to provide an improved wheel assemblage comprising two main parts which are each provided with independent bearings.

Still another specific object of the present invention is to provide an improved method of constructing a sheet-metal wheel of attractive appearance, and wherein the bearings are protected and confined even upon dismantling of the wheel.

These and other specific objects and advantages of the invention will be apparent from the following detailed description.

A clear conception of the features constituting my present improvement, and of the construction and operation of wheel units embodying the invention and assembled in accordance with my improved method, may be had by referring to the drawing accompanying and forming a part of this specification wherein like reference characters designate the same or similar parts in the several views.

Fig. 1 is a side elevation of a typical wheel provided with a peripheral rubber tire and constructed and assembled in accordance with the invention;

Fig. 2 is a somewhat enlarged central vertical section through the finally assembled wheel of Fig. 1;

Fig. 3 is a similarly enlarged central vertical section through the wheel just prior to final assembly thereof; and Fig. 4 is a further enlarged central longitudinal section through one of the bearing caps of the wheel, showing a bearing being inserted therein.

While the invention has been shown and described herein as applied to and embodied in a typical sheet-metal wheel for supporting a portable vehicle body, it is not my desire or intention to thereby unnecessarily restrict the scope or utility thereof, since the improved structure is also applicable to wheels utilized for other purposes.

Referring to the drawing, the typical vehicle wheel shown therein by way of illustration, comprises in general, a pair of substantially similar oppositely disposed half sections or disk elements 10, 11 each having an annular peripheral rim portion 12 and a central hub section 13 integrally connected by a web section 14 and frustro-conical section 15, the web section 14 of each disk element 10, 11 being provided with an annular series of similarly-spaced and alineable apertures 16 and the wall of the hub section 13 of the disk element 10 being imperforate with a central aperture 17 formed in the hub section 13 of the disk element 11; a tubular member or bearing cap 18 for the central hub section 13 of each disk element 10, 11, each bearing cap 18 being provided with an outwardly extending annular flange 19 adapted to be secured by means of an annular series of spot welds 20 or the like to the inner wall of its respective disk element; one or more annular bearing elements 21 housed within the tubular portion of each bearing cap 18 and retained therein between an inturned flange 22 at the free end of its respective bearing cap and the wall of the respective hub sections 13; an annular tire 23 formed of rubber or the like adapted for snug confinement within the cooperating rim portions 12 upon assembly of the disk elements 10, 11; and a plurality of bolts 24 for insertion into the apertures 16 in the web sections 14 upon alinement thereof to unite the disk elements 10, 11 at their web sections.

The wheel sections or disk elements 10, 11 as well as the bearing caps 18 are preferably formed of sheet metal with the aid of punches and dies or by spinning or casting if desired; and it is to be noted that the several parts are of similar configuration, thereby necessitating but one set of dies. The tires 23 are preferably constructed of rubber stock, and may be either solid or semipneumatic. The tires may be of any suitable diameter, but they are preferably of such diameter as to extend some distance laterally beyond the edges of the rim portions 12, thereby serving as a bumper or cushion when the wheel is knocked against an object such as an article of furniture or a door casement. The bearing elements 21 are formed of a suitable wearing material and may be purchased on the open market.

The improved wheel may be constructed and assembled in the following manner: The disk elements 10, 11 are first shaped in a suitable manner to provide the annular rim portions 12, central hub sections 13, and uniting web sections 14 and frusto conical sections 15. This shaping of each disk may be accomplished in an obvious manner in a single operation. The apertures 16 may thereafter be punched or drilled in the web sections 14 of each disk, and this may likewise constitute a single operation. Next, the central aperture 17 is formed in the hub section 13 of the disk 11 in an obvious manner; and after the bearing caps 18 have been formed and the bearing elements 21 inserted therein as shown in Fig. 4, each disk element 10, 11 may be provided with one of the caps 18 and its enclosed bearing 21 by securing the cap flange 19 to the inner wall of the hub section 13 by spot welds 20 or the like, whereupon each half section of the wheel is complete with its independent bearing retained in place. To mount the wheel upon a shaft or axle 25 and complete the assembly thereof, the disk element 11 is first positioned upon the shaft 25, as shown in Fig. 3 with the shaft passing through the aperture 17 and bearing element 21 a sufficient distance to permit insertion of the retaining pin 26 or other suitable means such as a snap ring. The tire 23 may then be placed in the rim portion 12 of the disk 11 and the disk element 10 positioned on the shaft 25 with the end of the shaft 25 confined within the bearing element 21 adjacent the imperforate hub wall of the disk element 10; and the structure may be finally united by alining the apertures 16 in the web sections 14 of the disks 10, 11, passing the shanks of the bolts 24 therethrough, and applying and tightening the nuts in an obvious manner. To dismantle the wheel, the bolts 24 may be removed, the disk 10 withdrawn from the shaft 25, the pin 26 removed, and the disk 11 withdrawn from the shaft 25.

From the foregoing detailed description, it will be apparent that my present invention provides an improved wheel which is simple, compact, light and durable in construction, which is moreover highly attractive in appearance, and which may be readily assembled in a convenient manner in accordance with my improved method. The particular formation of the disk elements 10, 11 with the cooperating web sections 14 and frustro-conical sections 15 integrally uniting their respective rim portions 12 and hub sections 13 permits an exceedingly strong and durable wheel structure formed of sheet-metal; and by constructing the wheel of two main parts 10, 11 as shown and described herein with each of the main parts provided with its own independent bearings confined in proper position, the wheel may be dismantled by a novice and reassembled without danger of losing parts or improper application of parts during assembly thereof. With the means for retaining the wheel on the shaft or axle housed within the hub portions of the readily separable disk or opposed wheel elements 10, 11 an assemblage is provided wherein the shaft or axle 25 may terminate within the disk elements, thereby resulting in a wheel assemblage having no hub parts projecting beyond the integral hub section 13 of the wheel and eliminating the usual separate hub cap. The wheel may be provided with a peripheral tire of rubber or the like of the desired thickness; and by reason of the present construction wherein outwardly projecting hub parts are eliminated, the tire may, by projecting laterally beyond all other parts of the wheel, act as a cushion or bumper for the wheel upon inadvertent or careless scraping or knocking of the wheel against objects. Obviously other suitable means may be substituted for the machine bolts 24 for securing the disks together and rivets, bolts, or the like may be utilized in lieu of spot welding 20 for securing the bearing caps 18 in place.

It should be understood that it is not desired or intended to limit this invention to the exact details of construction or to the precise method of assembling or mode of utilizing the improved wheel, herein shown and described, for various modifications within the scope of the appended claims, may occur to persons skilled in the art to which this invention pertains.

I claim:

1. A wheel and wheel mounting comprising a wheel having a central housing, said central housing including therein a pair of opposed axially disposed bearing recesses each such recess being defined by a circular flange of less diameter than said central housing and directed inwardly from a wall of said central housing, and an axial opening into said housing of less diameter than said bearing recesses for the passage of an axle into said housing; bearing means in said bearing recesses; an axle having one end cylindrically fitted within said bearing means to preclude lateral displacement of said axle in said bearing means; and means within said housing holding said axle against withdrawal from said bearing means.

2. A wheel and wheel mounting comprising a wheel having a central housing, said central housing including therein a pair of opposed axially disposed bearing recesses each such recess being defined by a circular flange of less diameter than said central housing and directed inwardly from a wall of said central housing, and an axial opening into said housing of less diameter than said bearing recesses for the passage of an axle into said housing; bearing means in said bearing recesses; an axle having one end journalled in said bearing means; and means within said housing and between said bearing means for preventing longitudinal displacement of said axle.

3. A wheel and wheel mounting comprising a wheel having a rim and a central housing lying entirely within the opposite side planes of said rim, said central housing including therein a pair of opposed axially disposed bearing recesses each such recess being defined by a circular flange of less diameter than said central housing and directed inwardly from a wall of said central housing, and an axial opening into said housing of less diameter than said bearing recesses for the passage of an axle into said housing; bearing means in said bearing recesses; an axle having one end journalled in said bearing means; and means within said housing and between said bearing means for preventing longitudinal displacement of said axle.

4. A wheel and wheel mounting comprising a wheel having a central housing, said central housing including therein a pair of opposed axially disposed bearing recesses each such recess being defined by a circular flange of less diameter than said central housing and directed inwardly from a wall of said central housing and each such circular flange having an integral inturned flange at its free end remote from its carrying wall, and an axial opening into said housing of less diameter than said bearing recesses for the passage of an axle into said housing; bearing means confined entirely within each of said bearing recesses; an axle having one end journalled in said bearing means; and means within said housing and cooperable with the inturned end flanges of said circular recess forming flanges for preventing longitudinal displacement of said axle.

MILTON G. SCHLEY.

REFERENCES CITED

The following references are of record in the file of this patent:

UNITED STATES PATENTS

| Number | Name | Date |
|---|---|---|
| 1,091,796 | Bines | Mar. 31, 1914 |
| 1,395,734 | Root | Nov. 1, 1921 |
| 1,408,825 | Palmer | Mar. 7, 1922 |
| 1,676,874 | Shoemaker | July 10, 1928 |
| 1,708,969 | Gill et al. | Apr. 16, 1929 |
| 1,901,759 | Maranville | Mar. 14, 1933 |
| 1,973,747 | Bukolt | Sept. 18, 1934 |

FOREIGN PATENTS

| Number | Country | Date |
|---|---|---|
| 698,095 | France | Jan. 27, 1931 |
| 628,203 | Germany | Mar. 30, 1936 |